UNITED STATES PATENT OFFICE 2,498,201

DEODORIZING REFINED PETROLEUM OILS AND WAXES

Earl C. Daigle, Beaumont, Tex., assignor to Socony-Vacuum Oil Company, Incorporated, New York, N. Y., a corporation of New York No Drawing. Application February 12, 1947, Serial No. 728,204

6 Claims. (Cl. 196—21)

This invention is directed to a method of treating petroleum products for the improvement of odor. More particularly, the present invention is concerned with the removal of the disagreeable rancid odor resulting when petroleum hydrocarbons are intimately contacted with air at moderately elevated temperatures for drying purposes.

Moisture may be removed from petroleum waxes and oils by air-blowing at temperatures of the order of 170° F. to 210° F. This procedure of drying often gives rise to a petroleum product having an offensive rancid odor which detracts considerably from its market value. Many of the petroleum waxes and refined oils are used in the compounding of pharmaceutical specialties and for other purposes where they must be prepared free of disagreeable odors. Microcrystalline waxes are used in ointments and the like, and neutral oils and mineral seal oils are frequently employed as ingredients of sprays, insecticides, etc. Even when applied for lubricant use, odor must frequently be removed to make a product of desirable quality.

This invention is predicated on the discovery that a marked improvement in odor can be effected in products of the kind described by a treatment thereof with gaseous sulfur dioxide subsequent to the air-drying operation in which said odor is developed.

Any convenient manner of bringing dry sulfur dioxide into intimate contact with the air-dried petroleum hydrocarbon may be employed in accordance with the present invention. The amount of sulfur dioxide used in effecting a substantial removal of rancid odor from air-dried hydrocarbon will, of course, depend upon the strength and persistency of said odor. The method of this invention contemplates the use of those amounts of sulfur dioxide which will effect a substantial improvement in odor. Likewise, it will be understood that the time of contact between sulfur dioxide and the petroleum hydrocarbon under treatment need only be of duration sufficient to substantially remove the rancid odor from said hydrocarbons. Generally, a relatively short contact time of five to ten minutes with the use of sulfur dioxide, in quantities ranging from about 0.002 to about 0.02 per cent by weight of material treated, has been found to yield a product of satisfactory odor. The above mentioned quantities, however, are not to be considered as limiting the scope of this invention, since excess amounts of sulfur dioxide may readily be removed from the treated product by subsequent air-blowing.

The preferable method of deodorizing treatment in accordance with this invention is to place the air-dried petroleum product to be treated in an agitator of the normal type of a size proportionate to the batch being treated, heat the product to a moderately elevated temperature of the order of 170° F. to 190° F. and agitate with air in the usual manner and then introduce sulfur dioxide into the agitator by injection into the air which is used to agitate the material. This introduction of sulfur dioxide into the mass will suitably be made gradually over a period usually not exceeding about ten minutes. Excess sulfur dioxide is then removed from the mass by air-blowing at a temperature between about 170° F. and about 190° F., preferably at about 180° F., particular care being maintained that said blowing be stopped when the removal of excess sulfur dioxide is complete.

As an example of the above described treatment, the deodorizing of air-dried microcrystalline wax may be cited. Moisture-containing microcrystalline wax was dried in an agitator of suitable size by air-blowing at a temperature of about 180° F. until moisture was substantially removed therefrom. Sulfur dioxide, in the extent of 0.02 pound per barrel (300 pounds) of wax, was then introduced into the agitator air line at a rate requiring 10 minutes treating time. The molten wax in the agitator was agitated at a moderate rate with air during sulfur dioxide addition to insure complete admixture. At the completion of the sulfur dioxide addition, the excess sulfur dioxide was removed by air-blowing at 180° F. The wax was blown for about 30 minutes and then checked for odor of sulfur dioxide each 5 minutes thereafter. The odor was found to be satisfactory when only a trace of sulfur dioxide was present in the top of the agitator while it was being blown. Care was taken to stop the blowing when removal of sulfur dioxide was substantially complete. Evaluation of the wax for odor was then made by testing a sample thereof by the method which consists of comparing the odor of the treated sample with the odor of a blank which had not been treated with sulfur dioxide. Samples of the molten waxes were poured onto cellophane and allowed to cool. The wax-coated cellophane was then cut into strips and placed in glass-covered jars which were maintained in an oven at a temperature of 100° F. for 16 hours. The jars were then removed from the oven and the odors compared. The sample of wax which had been treated with sulfur dioxide was found to be substantially odorless, while the untreated sample had a strong, offensive, rancid odor.

In a similar manner, air-dried petroleum oils and waxes can be treated to remove odor of the rancid type. This odor is not to be confused with the so-called "distillate odors" due presumably to sulfur compounds contained in the oil, but arises during the aforementioned air-drying operation at moderately elevated temperatures.

The temperature at which the air-drying, sulfur dioxide addition, and subsequent air-blowing to remove excess sulfur dioxide is carried out will generally be between 170° F. and 190° F. and will usually be maintained more or less constant during the aforementioned operations. When the petroleum hydrocarbon being treated is a wax, the treating temperature will be above the melting point thereof but usually not in excess of about 40° F. above the melting point. A treating temperature about 20° F. above the melting point of wax is to be preferred. Thus, for the treatment of ordinary microcrystalline wax, a temperature of about 180° F. was found to yield excellent results.

While the above described method of sulfur dioxide addition by injection into the air used to agitate the hydrocarbon product has been found to be preferable, it will be understood that the present invention also contemplates the introduction of sulfur dioxide into the air-dried hydrocarbon mass through a separate conduit. The mixture, under such circumstances, may either be agitated with air, other inert gas, or by a mechanical agitator.

I claim:

1. A process for producing substantially moisture-free, odorless refined petroleum oils and waxes, which comprises maintaining a moisture-containing refined petroleum product of the aforesaid character at a temperature between about 170° F. and about 190° F. in a substantially liquid condition, blowing said product with air until substantially free of moisture, introducing into said product a small amount of gaseous sulfur dioxide sufficient to remove the rancid odor developed as a result of the aforesaid air-blowing and to yield a substantially dry, odorless petroleum product.

2. A process for producing substantially moisture-free, odorless refined petroleum oils and waxes, which comprises maintaining a moisture-containing refined petroleum product of the aforesaid character at a temperature between about 170° F. and about 190° F. in a substantially liquid condition, blowing said product with air until substantially free of moisture, introducing into said product a small amount of gaseous sulfur dioxide sufficient to remove the rancid odor developed as a result of the aforesaid air-blowing, and removing excess sulfur dioxide from said product to yield a substantially dry, odorless petroleum product.

3. A process for producing substantially moisture-free, odorless refined petroleum oils and waxes, which comprises maintaining a moisture-containing refined petroleum product of the aforesaid character at a temperature between about 170° F. and about 190° F. in a substantially liquid condition, blowing said product with air until substantially free of moisture, introducing into said product a small amount of gaseous sulfur dioxide sufficient to remove the rancid odor developed as a result of the aforesaid air-blowing, and thereafter air-blowing the sulfur dioxide treated product until excess sulfur dioxide is removed therefrom to yield a substantially dry, odorless petroleum product.

4. A process for producing substantially moisture-free, odorless refined petroleum oils and waxes, which comprises maintaining a moisture-containing refined petroleum product of the aforesaid character in an agitator at a temperature between about 170° F. and about 190° F. in a substantially liquid condition, blowing said product with air until substantially free of moisture, injecting into the air line leading to said agitator a small amount of gaseous sulfur dioxide sufficient to remove the rancid odor developed as a result of the aforesaid air-blowing, and removing excess sulfur dioxide from said product to yield a substantially dry, odorless petroleum product.

5. A process for producing a substantially moisture-free refined petroleum wax of satisfactory odor, comprising maintaining a moisture-containing refined petroleum wax at a temperature above its melting point but not in excess of 40° F. thereof, blowing said molten wax with air until substantially free of moisture, introducing into said molten wax a small amount of gaseous sulfur dioxide sufficient to remove the rancid odor developed as a result of the aforesaid air-blowing, and removing excess sulfur dioxide from said wax.

6. A process for producing a substantially moisture-free refined petroleum wax of satisfactory odor, comprising maintaining a moisture-containing refined petroleum wax at a temperature about 20° F. above its melting point but not in excess of 40° F. thereof, blowing said molten wax with air until substantially free of moisture, introducing into said molten wax a small amount of gaseous sulfur dioxide sufficient to remove the rancid odor developed as a result of the aforesaid air-blowing, and air-blowing the sulfur dioxide treated wax until excess sulfur dioxide is removed therefrom.

EARL C. DAIGLE.

REFERENCES CITED

The following references are of record in the file of this patent:

UNITED STATES PATENTS

| Number | Name | Date |
|---|---|---|
| 1,240,792 | Dunham | Sept. 18, 1917 |
| 1,392,370 | Treneer et al. | Oct. 4, 1921 |
| 1,677,440 | Gary | July 17, 1928 |
| 1,710,143 | Black et al. | Apr. 23, 1929 |
| 1,927,823 | Davis et al. | Sept. 26, 1933 |
| 2,079,782 | Wells | May 11, 1937 |
| 2,187,883 | Lemmon | Jan. 23, 1940 |
| 2,455,670 | Graves | Dec. 7, 1948 |

FOREIGN PATENTS

| Number | Country | Date |
|---|---|---|
| 477,663 | Great Britain | Jan. 4, 1938 |